United States Patent [19]

Goddin, Jr. et al.

[11] 4,370,156
[45] Jan. 25, 1983

[54] PROCESS FOR SEPARATING RELATIVELY PURE FRACTIONS OF METHANE AND CARBON DIOXIDE FROM GAS MIXTURES

[75] Inventors: Clifton S. Goddin, Jr., Tulsa; Russell L. McGalliard, Broken Arrow, both of Okla.

[73] Assignee: Standard Oil Company (Indiana), Chicago, Ill.

[21] Appl. No.: 268,832

[22] Filed: May 29, 1981

[51] Int. Cl.³ ............................... F25J 3/02
[52] U.S. Cl. ........................... 62/17; 55/68; 55/73; 62/20; 62/24; 62/28; 208/189; 208/208 R
[58] Field of Search ............... 208/189, 207, 208 R, 208/236, 347, 350, 351, 354, 355; 55/68, 73; 62/9, 11, 12, 17, 20, 23, 24, 27, 28

[56] References Cited

U.S. PATENT DOCUMENTS 3,531,917 10/1970 Grunewald et al. .................. 55/73

Primary Examiner—Frank Sever
Attorney, Agent, or Firm—Lansing M. Hinrichs; William T. McClain; William H. Magidson

[57] ABSTRACT

A cryogenic process for separating relatively pure fractions of methane and carbon dioxide from mixtures thereof which also contain other components. The process utilizes a lean oil as an absorbent which performs the additional functions of preventing the formation of solid carbon dioxide within the apparatus and preventing formation of an azeotrope of carbon dioxide with ethane and enhancing the separation of hydrogen sulfide from carbon dioxide.

5 Claims, 1 Drawing Figure

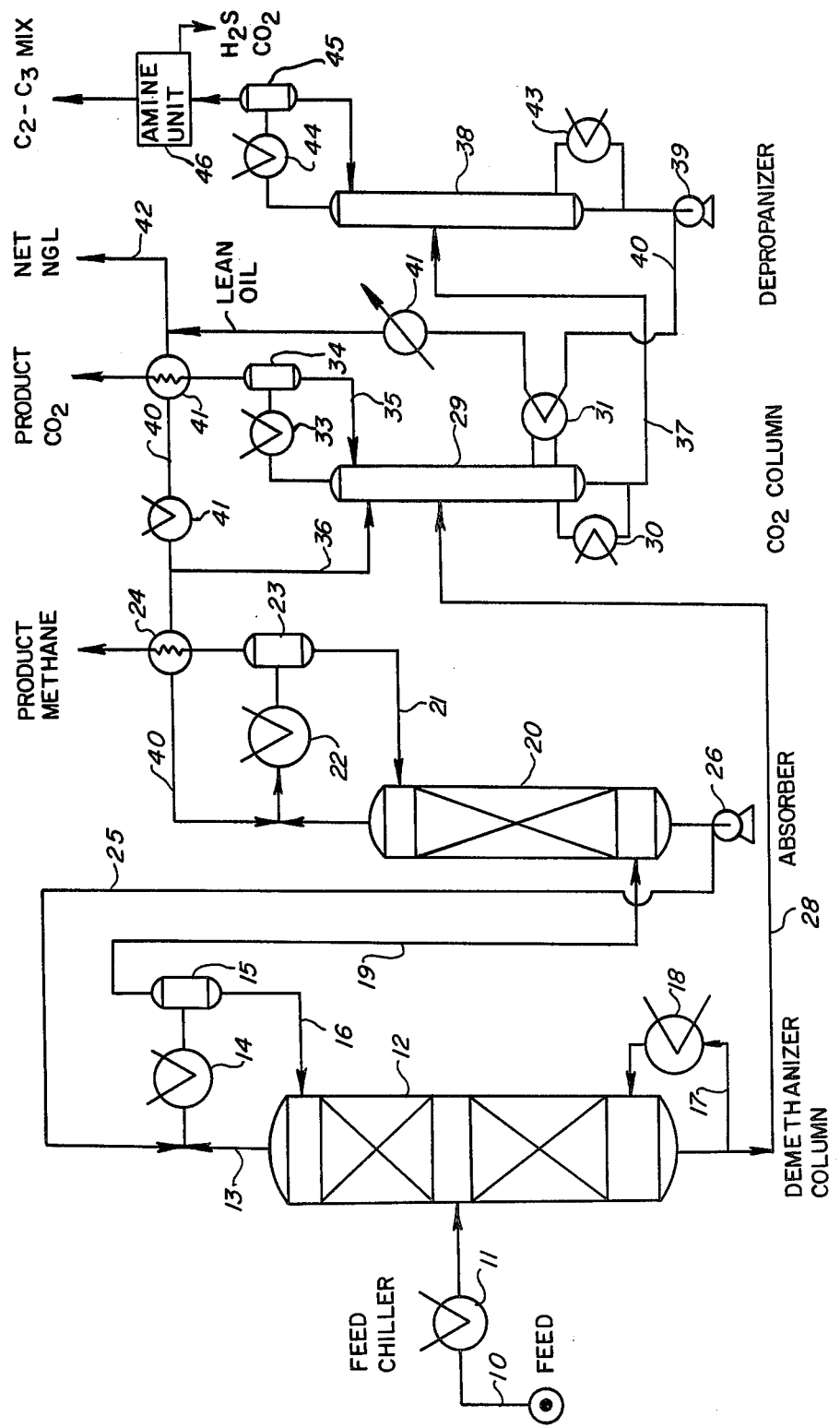

PROCESS FOR SEPARATING RELATIVELY PURE FRACTIONS OF METHANE AND CARBON DIOXIDE FROM GAS MIXTURES

BACKGROUND OF INVENTION

Abundant supplies of natural gas are in existence. Almost universally such supplies comprise mixtures of methane, ethane, natural gas liquids ($C_3$'s and higher) and acid gases such as carbon dioxide and hydrogen sulfide. Nitrogen and inert gases are usually also present in varying amounts.

Carbon dioxide can be employed in tertiary oil recovery from older oil fields by pumping it into selected wells in a field and withdrawing mixtures of hydrocarbons dislodged or extracted from the field by the action of a miscible bank of carbon dioxide. In addition to the extracted crude oil, a gas stream is produced which contains major proportions of carbon dioxide and various hydrocarbons and usually also contains hydrogen sulfide. Because carbon dioxide is utilized in the tertiary recovery, it usually is economical to recover it for reinjection.

The most valuable supplies of natural gas are generally those which have high contents of methane and higher hydrocarbons and relatively low contents of acid gases. Such gases can be readily purified to pipeline quality by absorption of the acid gases in an amine solution which is regenerated and reused. Regeneration, however, requires considerable energy, and the amine absorption process accordingly becomes unsuitable because of high energy costs in cases where the gas mixture to be treated contains high proportions of acid gases.

For gas mixtures having acid gas contents higher than about 20 mol percent, it generally is more economical to utilize other separation systems such as membrane permeation or cryogenic fractionation. In a conventional cryogenic system utilized for purification of a feed gas having about 40 mol percent carbon dioxide, the chilled feed gas is introduced into a demethanizer column maintained at a pressure of about 650 psia at an intermediate point. The overhead distillate leaves the column at a temperature of about minus 37° F. and is refrigerated to minus 75° F. The condensed liquid is reintroduced as reflux at the top of the column. The overhead vapor which contains about 14 mol percent carbon dioxide is subjected to amine absorption to remove the carbon dioxide, producing pipeline quality methane. The reason for "slopping" about 14 percent of the carbon dioxide in the demethanizer overhead is to keep the system temperatures above the carbon dioxide solidification point. If solid carbon dioxide is allowed to form, the system becomes inoperable due to plugging. A reboiler at the bottom of the column maintains the bottom temperature at about 64° F. The bottoms stream is conducted to a carbon dioxide separation column. The overhead from this column is carbon dioxide product, and the bottoms from the column are sent to natural gas liquids fractionation apparatus.

Other arrangements for coping with the problem at carbon dioxide solidification have been proposed. U.S. Pat. No. 2,996,891 to Tung and U.S. Pat. No. 3,242,681 to Shaievitz disclose methods in which the carbon dioxide is purposely solidified and thereafter separated from the liquid methane. The separation of the solid carbon dioxide, however, is not a simple operation, particularly at high pressure and low temperature conditions.

U.S. Pat. No. 3,784,466 to Arnold et al discloses methods for treating oil and gas to stabilize the oil. The gas removed from the oil is contacted with a solvent which has a greater affinity for heavier hydrocarbons, acid gases and water than for methane, ethane, and propane. The solvents named are acetone, propylene carbonate, dimethyl ether, polyethylene glycol, n-methyl-2-pyrrolidone, and methanol. The solvent is utilized to scrub a stream of rising gases. U.S. Pat. No. 3,252,269 to Woertz also discloses the use of selective solvents (particularly acetoxyacetone in combination with a second solvent) to effect absorption from the gas to be purified.

A second problem which arises after methane is cryogenically separated from carbon dioxide is that ethane and hydrogen sulfide as well as heavier hydrocarbons are separated as bottoms from the column together with the carbon dioxide and their separation from the carbon dioxide to render a relatively pure pipeline quality carbon dioxide is difficult. Ethane azeotropes with carbon dioxide in a conventional distillation column and comes off at the top with the carbon dioxide product. Hydrogen sulfide has a volatility close to that of carbon dioxide and the $CO_2$ product usually would fail to meet governmental requirements such as the Texas Railroad Commission Rule 36 limitation of 100 ppm of $H_2S$.

SUMMARY OF THE INVENTION

A primary object of this invention is to provide an energy efficient cryogenic process for separating relatively pure fractions of methane and carbon dioxide from a mixture thereof which also contains other components including ethane and higher hydrocarbons and hydrogen sulfide. The process comprises:

(a) Cooling the feed mixture to a temperature of between about zero° F. and minus 40° F. and introducing it into a column maintained at a pressure of between about 450 and about 650 psia;

(b) taking an overhead distillate stream from said column comprising methane and at least about ten mol percent carbon dioxide and absorbing carbon dioxide from said overhead stream by contacting it with a lean oil absorbent to produce sweet product methane containing less than two mol percent carbon dioxide.

(c) withdrawing a bottoms stream comprising carbon dioxide, ethane and higher hydrocarbons and hydrogen sulfide from said column and introducing the stream into a carbon dioxide separation column maintained at a pressure of between about 400 and about 500 psia;

(d) also introducing into said carbon dioxide column a stream of lean oil in sufficient amount to prevent the formation of an azeotrope of carbon dioxide with ethane and to enhance the volatility of carbon dioxide relative to hydrogen sulfide and thereby produce a sweet high purity product carbon dioxide overhead stream;

(e) withdrawing from the bottom of said carbon dioxide column a bottoms stream comprising hydrogen sulfide, a small amount of carbon dioxide, ethane and higher hydrocarbons;

(f) separating said lean oil from said bottoms stream to provide the lean oil requirements for the carbon dioxide absorption step set forth in (b) above and for introduction into said carbon dioxide column as is set forth in (d) above.

Somewhat more specifically the process of this invention comprises:

(a) cooling a methane carbon dioxide mixture comprising at least about twenty percent (20%) carbon dioxide to a temperature of between about zero° F. and minus 40° F. and introducing the mixture at an intermediate level into a fractionation column at a pressure of between about 450 and 650 psia;

(b) maintaining the top of the column at a temperature of between about minus 20° F. and minus 60° F. by refluxing of liquid condensed from the vapors withdrawn from the top of the column, the bottom of the column being maintained at a temperature of between about 50° F. to 120° F. by a reboiler which provides stripping vapor;

(c) introducing the bottoms stream into a carbon dioxide column at an intermediate level, the carbon dioxide column being provided with external reflux means at its upper end and reboiler means at its lower end whereby purified carbon dioxide product is withdrawn from the top of said column and a bottoms stream comprising ethane and higher hydrocarbons and hydrogen sulfide is withdrawn at the bottom;

(d) depropanizing the withdrawn bottoms stream from the second column by fractionation to separate acid gases and $C_3$'s from lean oil; and (e) recycling the lean oil fraction to an upper region of either or both of the columns to absorb $CO_2$ at a temperature level high enough to prevent the formation of solid carbon dioxide in the case of the first column and to enhance the separation of hydrogen sulfide from carbon dioxide in the case of the second column. In the preferred embodiment the first column is split into an initial demethanizer and a secondary absorber into which the lean oil is introduced.

DESCRIPTION OF THE DRAWING

The drawing is a flow diagram of a preferred system of apparatus for carrying out the process of this invention.

DETAILED DESCRIPTION OF THE INVENTION

The cryogenic separation process of this invention has greatest utility when utilized to separate and purify methane and carbon dioxide from gas mixtures which contain more than about twenty volume percent of carbon dioxide and at least about five percent methane. Typical feed mixtures having a high and low carbon dioxide content, which can be separated by the process of this invention, are set forth below.

| Component | High $CO_2$ | Low $CO_2$ |
|---|---|---|
| $N_2$ | 1.8 mol percent | 7.2 mol percent |
| $C_1$ | 9.3 | 37.5 |
| $CO_2$ | 80.0 | 20.0 |
| $H_2S$ | 0.2 | 0.2 |
| $C_2$ | 3.8 | 15.5 |
| $C_3$ | 3.1 | 12.6 |
| $C_4^+$ | 1.8 | 7.0 |

The novel process can best be understood by reference to the preferred system of apparatus as is illustrated in the drawing. The process and apparatus are described herein as developed for processing 8060 pound mols per hour of the high carbon dioxide content feed set forth above. Those familiar with the art will realize that equipment sizing and operating conditions such as are set forth in this detailed description are for illustrative purposes only and can be varied according to usual engineering practice to accommodate anticipated feedstocks and product purity requirements.

The feedstock is supplied through line 10 to chiller 11 where it is cooled to minus 20° F. prior to introduction preferably at an intermediate level in demethanizer column 12 maintained at a pressure of approximately 600 psia. The feed components in mols per hour are as follows:

| | |
|---|---|
| $N_2$ | 144 |
| $CO_2$ | 6448 |
| $H_2S$ | 16 |
| $C_1$ | 750 |
| $C_2$ | 310 |
| $C_3$ | 253 |
| $C_4^+$ | 139 |
| Total | 8060 |

The chiller 11 is preferably equipped with a separator (not shown) to remove heavier liquid hydrocarbons which are condensed. By this arrangement the lean oil fraction separated downstream in the process can be controlled to comprise primarily $C_4$'s and $C_5$'s.

The column 12 preferably can be a conventional bubble or valve tray type and is approximately 6.5 feet in diameter containing the equivalent of twenty theoretical trays. Alternatively, a packed column can be used. Overhead vapors (distillate) from the top of column 12 are conducted through line 13 through chiller 14 where they are partially condensed. The condensed liquid from separator 15 is returned to column 12 through line 16 at a temperature of approximately minus 60° F. Thus the top tray of column 12 is maintained at a temperature of about minus 25° F. Liquid from the bottom tray in column 12 passes through reboiler 18 to maintain the temperature at the bottom of column 12 at a temperature of approximately 50° F. Distillate vapors from separator 15 are conducted at a rate of 1487 mols per hour through line 19 to the bottom of carbon dioxide absorber 20 which is maintained at a temperature of approximately minus 50° F. and a pressure of about 590 psia. The demethanizer column 12 removes all of the nitrogen and all but about 22 mols per hour of the methane from the bottoms. However, the stream entering the bottom of absorber 20 contains about 15 mol percent carbon dioxide. In order to prevent freeze-up, the demethanizer column 12 must be operated in such fashion as to insure that no portion thereof or of the auxiliary equipment which provides reflux (cooler 14 and separator 15) shall be at a temperature below the freezing point of carbon dioxide at the highest concentration anticipated at that portion of the apparatus. This constraint results in an overhead stream containing a substantial amount of carbon dioxide (at least about 10–15 mol percent) which must be removed if pipeline quality product methane is to be produced.

The purpose of the absorber 20 is to effect removal of this residual carbon dioxide from the methane stream. ("Methane stream" as used herein shall mean methane plus more volatile components which may be present.) In general we have determined the most efficient absorber operation to be at the lowest temperature level consistent with maintaining an adequate temperature spread, perhaps 20°–30° F., above the $CO_2$ freeze point. The absorber 20 preferably has a diameter of about four feet and contains the equivalent of about ten theoretical trays. Alternatively a packed column may be employed. The preferred absorbent is a lean oil derived from the $C_4$ plus components in the feed. In this embodiment all of the $C_4$ plus components are utilized. Alternatively, if desired, a debutanizer column can be added and only the $C_5$ plus components utilized. Thus the term "lean oil" as used herein and in the claims shall mean any mixture of hydrocarbons obtainable having hydrocarbons higher than $C_3$'s. A particular advantage of using lean oil as the absorbent is that with most feedstocks a net production of natural gas liquids (NGL) is achieved and no make-up absorbent is required.

The lean oil absorbent is introduced at a rate of about 550 mols per hour into presaturator 22 through line 40 together with overhead vapors from the absorber 20. Vapors from the separator 23 constitute the product methane stream which passes through heat exchanger 24 to precool the lean oil. The saturated lean oil stream enters the absorber through line 21 at a temperature of about minus 80° F. The mol ratio of lean oil to distillate should be between about 0.40 and 0.95 depending upon the proportion of carbon dioxide in the feed, higher carbon dioxide feeds requiring higher ratios. This relatively high lean oil content of the absorber liquids raises the boiling temperatures and prevents freezing of carbon dioxide. In this example the top of the absorber is maintained at a temperature of minus 70° F. and the bottom at about minus 50° F. The bottoms liquid stream from absorber 24 contains about 19 mol percent carbon dioxide, 32 mol percent methane, 1.2 mol percent nitrogen, and the remainder is lean oil. This stream is pumped through line 25 by pump 26 through chiller 14 and separator 15 to enter the top of the demethanizer column through line 16 in the reflux stream. The rate of supply of this bottoms stream to chiller 14 is about 1150 mols per hour. Thus the carbon dioxide removed by absorption in the lean oil is returned to the demethanizer column 12.

Hydrogen sulfide present in the feed is almost completely removed from the product methane so a sweet pipeline quality product is obtained. The methane product composition is methane and lighter 98.6 percent, carbon dioxide 1.2 percent, $C_4^+$ 0.2 percent and hydrogen sulfide less than three parts per million.

As will be apparent to those familiar with the art, the lean oil absorber and the demethanizer functions can be combined into a single column. In such instance, a side chiller would be provided for removing, chilling, and reinjecting liquid between the top absorber section of the tower and the bottom demethanizer section. The arrangement shown in the drawing with separate demethanizer and absorber columns may be preferred, however, due to reduced apparatus height.

The bottoms stream from the demethanizer column 12 passes through line 28 to an intermediate level in the carbon dioxide column 29 which operates at a pressure of about 450 psia. This stream comprises:

|  |  |
|---|---|
| $CO_2$ | 6437 |
| $H_2S$ | 16 |
| $C_1$ | 22 |
| $C_2$ | 310 |
| $C_3$ | 256 |
| $C_4^+$ | 684 |
| Total | 7725 |

The carbon dioxide column has a diameter of about ten feet and contains the equivalent of about 40 theoretical trays. It is equipped at the bottom with a reboiler 30 and an external heat exchanger 31 which provide heat to maintain the bottom of the column at about 300° F. The top of the column has a reflux condenser 33 and separator 34 which provide a reflux stream introduced near the top of the column through line 35. Also introduced near the top of the column through line 36, is a stream of lean oil at a rate of approximately 3800 mols per hour. The top of column 29 is maintained at a temperature of about 22° F. The lean oil supplied to column 29 preferably has the same composition as that introduced into the absorber 20, but lean oils of differing composition can be used if desired. The quantity of lean oil added, based upon the feed to column 29, can be between about 2.0 and about 0.40 mols of lean oil per mol of distillate, the ratio decreasing as the carbon dioxide content of the process feed increases. This corresponds to maintaining a minimum concentration of about 45 mol percent in the tray liquid. Because the lean oil prevents azeotrope formation, column 29 accomplishes an excellent separation of carbon dioxide from ethane. Moreover, the presence of the lean oil enhances the volatility of carbon dioxide relative to hydrogen sulfide and the column thereby produces a sweet high purity carbon dioxide product. Ethane and hydrogen sulfide together with lean oil exit in the bottoms stream through line 37. The overhead vapor stream from separator 34 constitutes product carbon dioxide and typically comprises:

|  |  |
|---|---|
| $CO_2$ | 6410 |
| $C_1$ | 22 |
| $C_2$ | 149 |
| $C_3^+$ | 20 |
| $H_2S$ | 0.4 |
| Total | 6601.4 |

The $H_2S$ amount stated above is equivalent to about 60 ppm. Thus pipeline quality carbon dioxide is produced which is quite suitable to be transported to other locations and which may be reused for miscible flooding operations.

The bottoms stream from the carbon dioxide column 29 containing virtually all of the lean oil and hydrogen sulfide with a small amount of $CO_2$ together with $C_2$ and $C_3$'s is conducted through line 37 to a depropanizer column 38 where it is introduced at an intermediate level. In this column, which operates at about 300 psia and has a diameter of about ten feet and contains the equivalent of about forty theoretical trays, the lean oil is separated as a bottoms stream and circulated by pump 39 through line 40 and heat exchangers 41 and 24 to absorber 20 and carbon dioxide column 29. Excess lean oil production emerges as net $C_4^+$ natural gas liquids (NGL) through line 42. The rate of net gain in $C_4^+$ NGL is approximately 92 mols per hour. A conventional reboiler 42 is provided at the bottom of column 38 and a reflux condenser 44 and separator 45 at the top. The vapor exiting the top of the separator is as follows:

|  |  |
|---|---|
| $C_2$ | 161 |
| $C_3$ | 252 |
| $C_4^+$ | 26 |
| $CO_2$ | 27 |
| $H_2S$ | 16 |

| -continued | |
|---|---|
| Total | 482 |

The acid gases (hydrogen sulfide and carbon dioxide) are preferably removed by a conventional amine scrubber 46 and sent to sulfur recovery. The sweet $C_2$–$C_3$ stream can be sold as an "E-P Mix" or further fractionated.

From the foregoing it will be apparent to those skilled in the art that an efficient cryogenic separation process for producing relatively pure methane and carbon dioxide products from gas mixtures has been provided. The specific case described relates to a feed gas mixture relatively high in carbon dioxide and is representative of a mixture which would present considerable difficulty using conventional techniques. Even richer mixtures, however, up to about 95 mol percent carbon dioxide can be handled by the process of this invention if desired. On the other hand, the process is also applicable to mixtures containing as little as about twenty percent carbon dioxide, but below that level other processes such as amine scrubbing are usually more efficient. Features such as vessel sizing and operating parameters are, of course, dependent upon the rate and composition of feedstock and desired product specifications and the items set forth above are intended to be illustrative only and not as limitations of the invention.

In the example described above the feed contains sufficient lean oil components to provide for a net NGL gain. Most gas mixtures to be separated contain sufficient lean oil component, but if such is not the case, make-up lean oil from some other source can be employed. In either case it is desirable to have a supply of lean oil on hand for start-up purposes, and appropriate tankage should be provided. The use of lean oil both to prevent the freezing of carbon dioxide in the methane separation step, and to prevent the azeotroping of ethane with carbon dioxide and to enhance the separation of hydrogen sulfide in the carbon dioxide separation step provides a convenient way of obtaining foolproof operation in the methane separation steps and high purity, sweet carbon dioxide in the carbon dioxide separation step.

Various changes and modifications in the process in addition to those set forth above will present themselves to those familiar with the art and may be made without departing from the spirit of this invention whose scope is defined by the following claims.

We claim:

1. A cryogenic process for separating relatively pure fractions of methane and carbon dioxide from a mixture thereof containing at least about twenty mol percent (20%) carbon dioxide and at least about five mol percent (5%) methane and which also contains other components including ethane and higher hydrocarbons and hydrogen sulfide, said process comprising:
    (a) Cooling said mixture to a temperature of between about zero° F. and minus 40° F. and introducing said mixture into a demethanizer distillation column maintained at a pressure of between about 450 and about 650 psia;
    (b) taking an overhead distillate stream from said column comprising methane and at least about ten mol percent carbon dioxide and absorbing said carbon dioxide from said overhead stream by contacting it with a lean oil absorbent to produce sweet product methane containing less than two mol percent carbon dioxide;
    (c) withdrawing a bottoms stream comprising carbon dioxide, ethane and higher hydrocarbons and hydrogen sulfide from said column and introducing said bottoms stream into a carbon dioxide separation column maintained at a pressure of between about 400 and about 500 psia;
    (d) also introducing into said carbon dioxide column a stream of lean oil in sufficient amount to enhance the volatility of carbon dioxide relative to hydrogen sulfide and thereby produce a sweet high purity product carbon dioxide overhead stream;
    (e) withdrawing from the bottom of said carbon dioxide column a bottoms stream comprising hydrogen sulfide, ethane and higher hydrocarbons;
    (f) separating said lean oil from said bottoms stream to provide the lean oil requirements for the carbon dioxide absorption step set forth in (b) above and for introduction into said carbon dioxide column as is set forth in (d) above.

2. The process as set forth in claim 1 wherein the quantity of lean oil utilized to absorb carbon dioxide from the overhead stream in step (b) is between about 0.40 and about 0.95 mols of lean oil per mol of overhead stream and the temperatures within the absorption step are greater than minus 70° F.

3. The process set forth in claim 2 wherein the quantity of lean oil added to the carbon dioxide column is between about 0.40 and about 2.0 mols of lean oil per mol of overhead $CO_2$.

4. The process of claim 3 wherein the quantity of lean oil components in the feed to the process exceeds process losses of lean oil so that a net gain in natural gas liquids results.

5. A cryogenic process for separating relatively pure fractions of methane and carbon dioxide from mixtures thereof which also contain other components, including ethane and higher hydrocarbons and hydrogen sulfide, said process comprising:
    (a) cooling said methane carbon dioxide mixture comprising at least about twenty mol percent (20%) carbon dioxide and at least about five mol percent (5%) methane to a temperature of between about minus 10° F. and minus 40° F. and introducing the mixture at an intermediate level into a demethanizer distillation column maintained at a pressure of between about 450 and 650 psia;
    (b) maintaining the top of said column at a temperature of between about minus 20° F. and minus 60° F. by refluxing of condensed vapors withdrawn from the top of said column, the bottom of said column being maintained at a temperature of between about 50° F. to 120° F. by a reboiler which provides a stripping vapor for the column;
    (c) introducing the bottoms stream into a carbon dioxide column at an intermediate level, the carbon dioxide column being provided with external reflux means at its upper end and reboiler means at its lower end whereby purified carbon dioxide product is withdrawn from the top of said carbon dioxide column and a bottoms stream comprising ethane and higher hydrocarbons and hydrogen sulfide is withdrawn at the bottom;
    (d) depropanizing the withdrawn bottoms stream from the carbon dioxide column by fractionation to separate hydrogen sulfide and $C_3$'s from lean oil; and (e) recycling the lean oil fraction to an upper region of either or both of the columns to permit operating at temperatures high enough to prevent the formation of solid carbon dioxide in the methane separation step and to increase the volatility of carbon dioxide relative to hydrogen sulfide in the case of the carbon dioxide column.

* * * * *